Francis A. D. Sadler
By: Scrivener & Parker

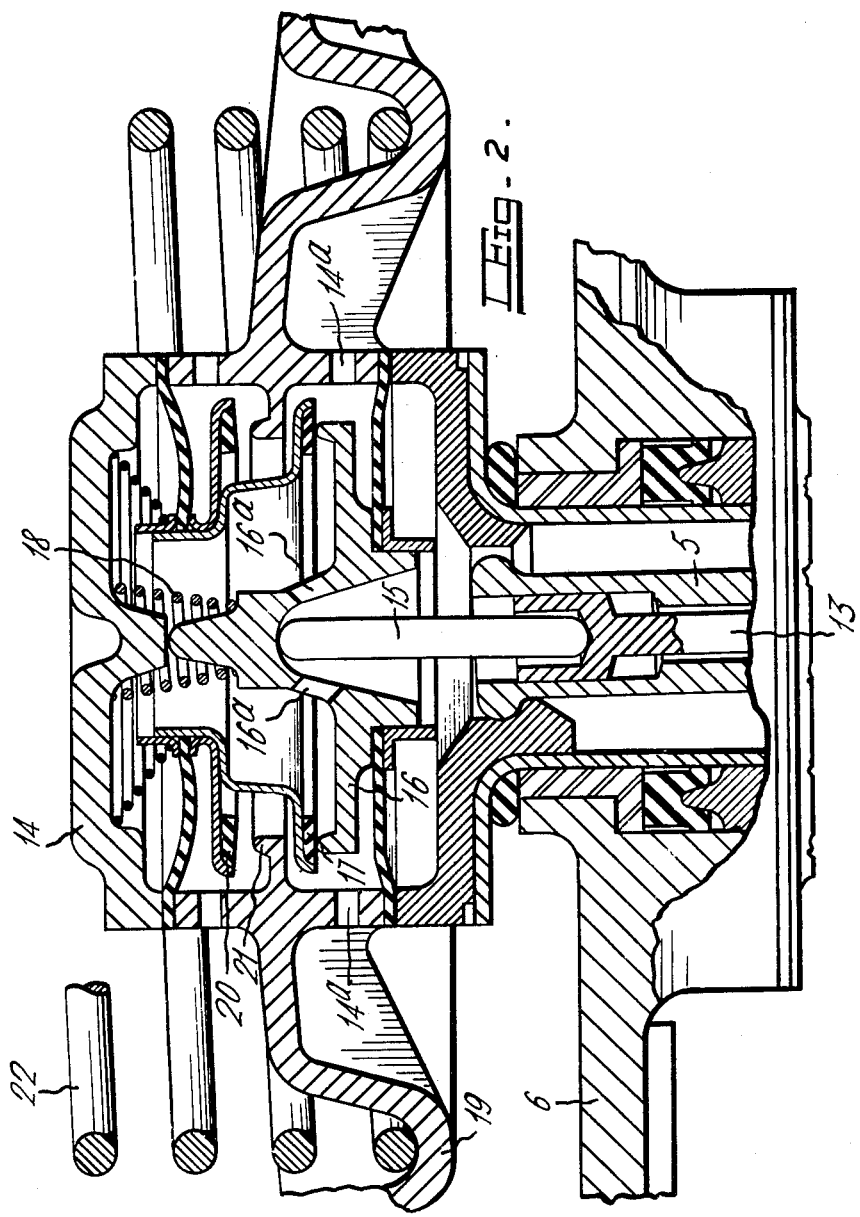

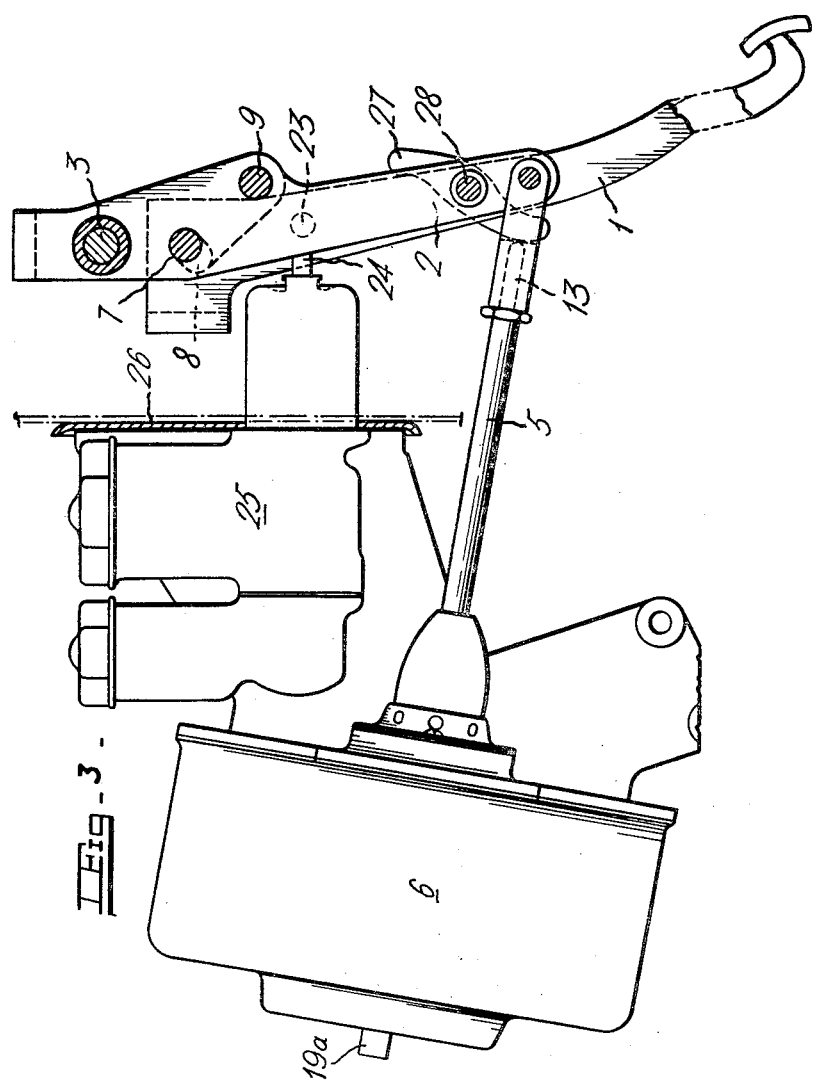

United States Patent Office 3,138,071
Patented June 23, 1964

3,138,071
BOOSTER ASSISTED ACTUATING SYSTEMS
Francis Antony Dawson Sadler, Little Aston, near Sutton Coldfield, England, assignor to Girling Limited, Birmingham, England, a British company
Original application June 13, 1960, Ser. No. 35,822, now Patent No. 3,075,502, dated Jan. 29, 1963. Divided and this application Nov. 28, 1962, Ser. No. 240,619
4 Claims. (Cl. 91—384)

This is a division of Serial No. 35,822 filed June 13, 1960, now Patent No. 3,075,502.

This invention relates to a booster for a booster-assisted actuating system, that is to say, for a system in which an input force is amplified by the application of an auxiliary force controlled by the input force. In particular the invention relates to fluid-operated boosters, i.e. those in which the auxiliary force is applied by fluid pressure, usually air pressure, controlled by valves influenced by the input force.

According to the invention, in a fluid-operated booster, in which the auxiliary force applied by the booster is exerted through the medium of a piston rod connected to a piston or diaphragm, the admission of the operating fluid is controlled by valves mounted in the piston or diaphragm and acted on by means which move in a direction opposite to the direction of movement of the piston rod. That is to say, movement of the valve-actuating means in one direction causes the admission of fluid in such a direction as to move the piston or diaphragm in the opposite direction.

Preferably, according to a further feature of the invention, the booster is connected in an actuating system in such a manner that, in the event of failure of the booster, the system can be actuated by the input force without the force having to carry the moving parts of the booster with it. This reduces substantially the force required, as compared with those systems in which the booster is positively connected in the system and has to move with the linkage even when it is out of action.

Where the booster is to be applied to the operating linkage between a brake pedal and a braking system of a motor vehicle it is of advantage if the booster can be mounted on the opposite side of the scuttle or bulkhead from the brake pedal lever, and yet mounted at a reasonably low level. This is simplified if, according to a further feature of the invention, the booster is arranged to pull rather than push, i.e. if its piston rod acts in tension. This means that the booster can be mounted on the opposite side of the bulkhead from the brake pedal lever and yet can act along a substantially horizontal line below the level of the fixed pivot about which the brake pedal lever turns.

The invention will now be described by way of example with reference to the accompanying drawings, in which:

FIGURE 2 shows to a larger scale the valve assembly of the booster of FIGURE 1 or FIGURE 3;

FIGURE 3 shows an alternative mounting for the booster of FIGURE 1, with the linkage re-arranged to a layout which is more convenient for installation in some vehicles.

Figure 1:
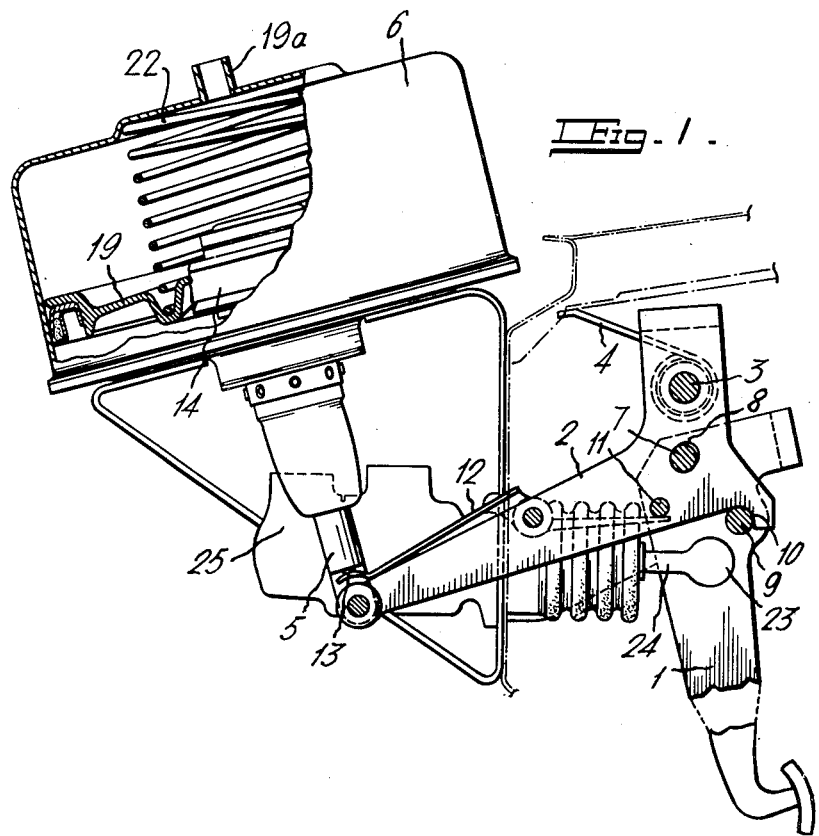
FIGURE 1 shows a booster embodying the invention and applied to the assistance of the effort applied by a lever to a hydraulic master cylinder.

Referring first to FIGURE 1 a first lever 1, which may be the brake pedal lever of a motor vehicle, is associated with a second lever 2 pivoted about a fixed point at 3. This second lever is urged about the pivot 3 in a counter-clockwise direction by a spring 4 and its free end is engaged by the operating rod or piston rod 5 of a booster cylinder 6 which derives its power from a source of vacuum (not shown) which is in communication with the upper part of the cylinder.

The first and second levers are coupled together by a pin 7 on the first lever engaging in an elongated hole 8 in the second lever, and a further pin 9 on the first lever received in a notch 10 formed in the edge of the second lever. A peg 11 on the first lever engages one end of a rocking arm 12 pivoted to the second lever, the other end of this arm engaging a push-rod 13 which is co-axial with the operating rod 5 and slides in it. This push-rod 13 actuates a valve assembly 14 which is mounted in the piston 19 of the booster.

This valve assembly is shown in FIGURE 2. The push-rod 13, acting through a further rod 15, normally holds a disc 16 against an annular valve head 17, against the action of a spring 18, to cut off communication between atmosphere and that part of the cylinder lying below the piston 19. At the same time it holds a further valve head 20, which moves with the head 17, clear of its seating 21 so that the parts of the cylinder 6 on the two sides of the piston are in communication. As mentioned earlier, the upper end of the cylinder 6, i.e. the part above the piston 19, is permanently connected to a source of vacuum by way of a vacuum connection 19a.

The general principle of operation of valves controlling boosters are well known. However, in known arrangements of the kind in which the valve assembly is mounted in the piston or diaphragm the movement of the valves in a given direction results in movement of the piston or diaphragm in the same direction. It will be seen from what follows that in the case of the arrangement according to the invention the reverse is true.

With the valve parts in the positions shown in FIGURE 2 the space in the cylinder 6 below the piston 19 is in communication with that above the piston and the piston is urged by a spring 22 towards its lowermost position. Now when the lever 1 is urged in a clockwise direction it turns about the axis of the pin 9 by a small amount limited by the small movement permitted to the pin 7 in the slot 8. However, this movement is enough to cause the pin 11 to move upwards away from the right-hand end of the rocking arm 12, allowing the left-hand end of that arm to move downwards, resulting in downward movement of the push-rod 13 under the action of spring 18.

As the push-rod 13 is lowered, it first causes the valve head 20 to engage its seating 21, cutting off communication between the part 3 of the cylinder 6 on the two sides of the piston 19 and then the valve head 16 moves away from its seating 17, allowing atmospheric pressure to pass from around the piston rod 5 through passages 16a and 14a into that part of the cylinder 6 which is below the piston 19. This moves the piston upwards against the action of the spring 22, thus causing the piston rod 5 to move upwards, carrying with it the lever 2, which turns about its pivot 3.

It will thus be seen that downward movement of the rod 13 results in upward movement of the rod 5. The movement of the lever 2 under the action of the piston rod 5 augments the input force applied to the lever 1, resulting in an amplified output force which, in the present example, is applied through a rod 24 to a hydraulic master cylinder 25. The movement of the lever 2 tends to rock the arm 12 back to its original position in relation to the lever 2, cutting off the booster. The overall result is the setting up of a balance between the tendency of the booster to turn the levers 1 and 2 about the pivot 3 and the tendency of this movement to cut off the booster, so that the levers take up a position which is dependent on the input force applied to the lever 1, and the force applied through the rod 24 is proportional to that input force, but augmented by the booster 6.

The arrangement shown in FIGURE 3 is kinematically the same as that of FIGURE 1 but the parts have been re-arranged to suit a vehicle in which the relative positions of the booster, the master cylinder and the pedal lever of the arrangement of FIGURE 1 are inconvenient. The same reference numerals have been used where applicable. Here the lever 2 extends substantially vertically downwards in the same general direction as the brake pedal lever 1. The hydraulic master cylinder 25 on which the booster-assisted lever system acts is mounted on a bulkhead 26 and the booster 6 is mounted on the opposite side of this bulkhead from the levers 1 and 2, with its piston rod acting substantially horizontally. As the booster acts by pulling rather than by pushing, i.e. its piston rod 5 acts in tension, this means that the line of action of the booster can be below the level of the pivot 3, i.e. on the same side of the pivot 3 as the general direction in which the brake pedal lever 1 extends. This makes possible a neat and compact layout, with the relatively large bulk of the booster 6 placed conveniently in a position where there is usually space available for it in most vehicles.

In the arrangement shown in FIGURE 3 the pin 9 is on the lever 2 instead of on the lever 1, and it abuts against the edge of the lever 1. Actuation of the valve assembly, which is the same as that of FIGURE 1, is by a rocking arm 27, pivoted to the lever 2 at 28 and whose upper end engages behind the right hand edge of lever 1 at one end, whilst its other end engages the push-rod 13. It will be understood that, when the pedal at the lower end of the first lever 1 is pressed that lever will rock about the point of contact of the pin 9 with the edge of that lever. The movement of the lever 1 with respect to the lever 2 allows the upper end of the rocking arm 27 to move to the left as shown in the figure and consequently the arm 27 can rotate in a counterclockwise direction about its pivot point 28 on the lever 2 under the action of the push-rod 13 contained in the piston rod 5, this push-rod 13 being urged to the right by the spring 18 of the valve mechanism, in the same way as in the embodiment described earlier.

As in the embodiment shown in FIGURE 1 the movement of the push rod 13 in one direction causes the piston rod 5 to move in the opposite direction, pulling the lever 2 in a counterclockwise direction about the fixed pivot 3 and thereby, by engagement of the pin 9 behind the lever 1, pushing the lever 1 in a counterclockwise direction and moving the piston rod 24 of the master cylinder 25 to the left. This movement tends to restore the relative positions of the levers 1 and 2, thereby tending to turn the arm 27 in a clockwise direction and restore the valves to their original positions. As before a balance is set up and the overall effect is to augment the force which the pedal lever 1 is urged to act on the piston rod 24.

Both in the arrangement shown in FIGURE 1 and that in FIGURE 3 there is an important safety feature, namely, the fact that in the event of failure of the booster, for example through insufficient vacuum, the brake pedal lever can act on the rod 24 without having to move the piston rod 5 or any of the other parts of the booster 6. The lever 1 simply turns about the axis of the pin 7. This substantially reduces the pedal load as compared with those arrangements in which the booster piston necessarily moves with the remainder of the linkage, irrespective of whether the booster is operative or not, and it ensures that all the input force is usefully employed, just when it is needed most, i.e. in the absence of booster assistance.

It will be understood that whilst the invention has been described by way of example with reference to vacuum booster assistance of vehicle brakes, it could be applied to other situations where an effort causing a mechanical movement is assisted by a booster, and the source of power for the booster could for example be compressed air, or a liquid under pressure.

I claim:
1. A fluid-differential-operated booster comprising a cylinder, a movable wall within said cylinder, a piston rod attached to said movable wall and extending through an end wall of said cylinder, first valve means controlling communication between those portions of said cylinder which lie on opposite sides of said movable wall, a port adapted to communicate with a source of pressure differential, second valve means controlling communication between said port and that portion of said cylinder lying on one side of said movable wall, said first and second valve means being mounted on said movable wall, a valve-operating rod, said valve operating rod having an operative connection with said first and second valve means and being movable with respect to said movable wall along a line parallel to the axis of movement of said piston rod to operate said first and second valve means, and said first and second valve means being disposed in a manner whereby movement of said valve-actuating rod in one direction along said line results in operation of said first valve means to cut off communication between the portions of said cylinder lying on opposite sides of said movable wall and in operation of said second valve means resulting in a fluid flow such as to cause development of a pressure differential across said movable wall in a sense urging said movable wall, and the piston rod attached thereto, in a direction directly opposite to said one direction.

2. A fluid-differential-operated booster as set forth in claim 1, wherein said piston rod is hollow and said valve-operating rod lies within said piston rod and is coaxial therewith.

3. A fluid-differential-operated booster as set forth in claim 1 in which said one direction of movement of said valve-operating rod is in a sense from said movable wall towards said end wall through which said piston rod passes, the resultant direction of urging of said movable wall being thereby away from said end wall.

4. A booster-assisted actuating system comprising a force input lever, a secondary lever, a booster as set forth in claim 1, an operative connection between said piston rod of the booster and said secondary lever, an operative connection between said force input lever and said valve-actuating rod, and a one-way connection between said force input lever and said secondary lever, said one-way connection being operable in such a direction that said secondary lever necessarily moves said force input on movement of said piston rod and secondary lever as a result of the setting up of a pressure differential across said movable wall, whereas said force input lever is movable in the same direction without causing movement of said secondary lever and piston rod.

References Cited in the file of this patent
UNITED STATES PATENTS

| | | |
|---|---|---|
| 1,927,942 | Lobez et al. | Sept. 26, 1933 |
| 2,229,247 | Kamenarovic | Jan. 21, 1941 |
| 2,896,586 | Ayers | July 28, 1959 |
| 2,937,620 | Ayers | May 24, 1960 |
| 3,075,502 | Sadler | Jan. 29, 1963 |

FOREIGN PATENTS

| | | |
|---|---|---|
| 320,435 | Great Britain | Oct. 17, 1929 |